(12) United States Patent
Kim

(10) Patent No.: US 10,205,714 B2
(45) Date of Patent: Feb. 12, 2019

(54) APPARATUS AND METHOD FOR PROCESS AUTHENTICATION IN REDUNDANT SYSTEM

(71) Applicant: ELECTRONICS AND TELECOMMUNICATIONS RESEARCH INSTITUTE, Daejeon (KR)

(72) Inventor: Beob-Kyun Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 207 days.

(21) Appl. No.: 15/000,193

(22) Filed: Jan. 19, 2016

(65) Prior Publication Data

US 2017/0041305 A1 Feb. 9, 2017

(30) Foreign Application Priority Data

Aug. 4, 2015 (KR) .................. 10-2015-0109915

(51) Int. Cl.
*H04L 29/06* (2006.01)

(52) U.S. Cl.
CPC .......... *H04L 63/08* (2013.01); *H04L 63/0876* (2013.01)

(58) Field of Classification Search
USPC .......................................................... 726/6
See application file for complete search history.

(56) References Cited

U.S. PATENT DOCUMENTS

| | | | |
|---|---|---|---|
| 2002/0002706 A1* | 1/2002 | Sprunk ................ H04N 7/1675 725/29 |
| 2002/0108036 A1* | 8/2002 | Okaue ..................... G06F 21/10 713/168 |
| 2003/0120672 A1* | 6/2003 | Bingham ............ G06F 17/3089 |
| 2004/0107342 A1* | 6/2004 | Pham ..................... G06F 3/0622 713/165 |
| 2005/0257059 A1* | 11/2005 | Schaefer ................. H04L 63/08 713/176 |
| 2006/0063511 A1* | 3/2006 | Shima ................. H04L 12/2805 455/410 |
| 2007/0179978 A1* | 8/2007 | Lee ........................ G06Q 30/06 |
| 2009/0172784 A1* | 7/2009 | Park ........................ H04L 63/08 726/4 |
| 2012/0151208 A1 | 6/2012 | Park |
| 2014/0089196 A1* | 3/2014 | Paya ....................... G06F 21/31 705/44 |
| 2014/0201830 A1 | 7/2014 | Kim et al. |

(Continued)

FOREIGN PATENT DOCUMENTS

| KR | 1019990040321 A | 6/1999 |
| KR | 1020110139798 A | 12/2011 |
| KR | 1020140111466 A | 9/2014 |

*Primary Examiner* — Phy Anh T Vu
*Assistant Examiner* — Phy Anh Vu
(74) *Attorney, Agent, or Firm* — Ladas & Parry LLP

(57) ABSTRACT

Disclosed herein is an apparatus and method for authenticating a process. According to the method for authenticating a process, a neighboring node transmits adjacent authentication data to an execution node, the execution node authenticates a process to be executed by comparing local authentication data with the adjacent authentication data, and the execution node executes the corresponding process.

8 Claims, 6 Drawing Sheets

(56) References Cited

U.S. PATENT DOCUMENTS

2014/0259155 A1* 9/2014 Kim ..................... G06F 21/44
                                                    726/19
2014/0282864 A1* 9/2014 Thubert ............. H04L 63/1458
                                                    726/3
2018/0204204 A1* 7/2018 Giraudo ............ G06Q 20/1085

* cited by examiner

APPARATUS AND METHOD FOR PROCESS AUTHENTICATION IN REDUNDANT SYSTEM

CROSS REFERENCE TO RELATED APPLICATION

This application claims the benefit of Korean Patent Application No. 10-2015-0109915, filed Aug. 4, 2015, which is hereby incorporated by reference in its entirety into this application.

BACKGROUND OF THE INVENTION

1. Technical Field

The present invention generally relates to system security. More particularly, the present invention relates to an apparatus and method for authenticating a process in each node in a redundant system and preventing the process from being executed depending on the authentication result in order to improve the security and safety of the system.

2. Description of the Related Art

The present invention intends to improve the security and safety of a system by enhancing process authentication in a redundant system, which is generally adopted for high availability.

Various methods for preventing unauthorized processes from being executed are used for the security of a system. The most common method is to write unique information about each process on a separate medium in advance and to check whether the unique information about a process to be executed is the same as the corresponding written information. However, if unique information about each process is stored in a single system, if system root privileges are stolen, the system becomes incapacitated and it is necessary to add a system having a separate storage medium in addition to the single system, thus incurring additional costs.

The present invention relates to a method for protecting a system and saving additional costs whereby unique information about a process is distributed to and stored in neighboring nodes of a redundant system and is used to authenticate the process in a configuration that includes multiple nodes for high availability.

SUMMARY OF THE INVENTION

An object of the present invention is to authenticate a process before the execution thereof for the security of a system.

Another object of the present invention is to store unique information about a process, the execution of which is to be approved, in a neighboring node and to use the information in order to authenticate the process in a redundant system, which is adopted for high availability.

A further object of the present invention is to improve the security and safety of a system through process authentication.

Yet another object of the present invention is to reduce the cost of a redundant system by avoiding the use of an additional authentication data storage medium.

Still another object is to guarantee complete security at the process level unless all nodes in a redundant system are simultaneously hacked.

Still another object is to enable an administrator to prevent a node from being taken over by intruders if the node is a service node in the form of an embedded device or an appliance in which a process to be executed may be detected in advance.

In order to accomplish the above object, an apparatus for authenticating a process according to the present invention includes: an execution node for authenticating a process to be executed by comparing local authentication data with adjacent authentication data received from a neighboring node and for executing the process; and the neighboring node for transmitting the adjacent authentication data to the execution node in response to a request from the execution node.

The execution node may include: a local authentication data storage unit for storing multiple process identifiers; a local authentication data search unit for extracting local authentication data corresponding to the process to be executed from among the multiple process identifiers; an adjacent authentication data search unit for requesting and receiving adjacent authentication data corresponding to the process to be executed from the neighboring node; a process authentication unit for authenticating the process to be executed by comparing the local authentication data with the adjacent authentication data; and an execution unit for executing the process when the authentication is successful.

The execution node may further include a white list storage unit for storing a list of processes that do not need to be authenticated, and when the process to be executed is stored in the white list storage unit, the execution unit regards the process as being successfully authenticated and executes the process.

The process identifier may be maintained consistent throughout multiple executions of the process to be executed.

The process identifier may be extracted based on one or more of a code area, a header, and an extra flag of the process to be executed.

The neighboring node may include: an adjacent authentication data storage unit for storing multiple process identifiers; and an adjacent authentication data exchange unit for extracting adjacent authentication data corresponding to the process to be executed from among the multiple process identifiers, and transmitting the extracted authentication data to the execution node.

The neighboring node may comprise multiple neighboring nodes.

The execution node may authenticate the process to be executed by comparing the local authentication data with all of multiple pieces of adjacent authentication data received from the multiple neighboring nodes.

The execution node may authenticate the process to be executed by comparing the local authentication data with adjacent authentication data received from a preset neighboring node that is selected in advance from among the multiple neighboring nodes.

The preset neighboring node may be determined depending on the process to be executed.

Also, a method for authenticating a process according to an embodiment of the present invention may include: transmitting, by a neighboring node, adjacent authentication data to an execution node; authenticating, by the execution node, a process to be executed by comparing local authentication data with the adjacent authentication data; and executing, by the execution node, the process when authentication of the process is successful.

Authenticating the process to be executed may include: storing multiple process identifiers; extracting local authentication data corresponding to the process to be executed from among the multiple process identifiers; and comparing the local authentication data with the adjacent authentication data.

The method for authenticating a process may further include: storing a list of processes that do not need to be authenticated; and regarding the process to be executed as being successfully authenticated if the process is included in the list of processes.

Transmitting the adjacent authentication data may include: storing multiple process identifiers; extracting adjacent authentication data corresponding to the process to be executed from among the multiple process identifiers; and transmitting the adjacent authentication data to the execution node.

The neighboring node comprises multiple neighboring nodes, and transmitting the adjacent authentication data may be configured such that each of the multiple neighboring nodes transmits adjacent authentication data to the execution node.

Authenticating the process may be configured to authenticate the process to be executed by comparing the local authentication data with all of multiple pieces of adjacent authentication data received from the multiple neighboring nodes.

Authenticating the process may be configured to authenticate the process to be executed by comparing the local authentication data with adjacent authentication data received from a preset neighboring node that is selected in advance from among the multiple neighboring nodes.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
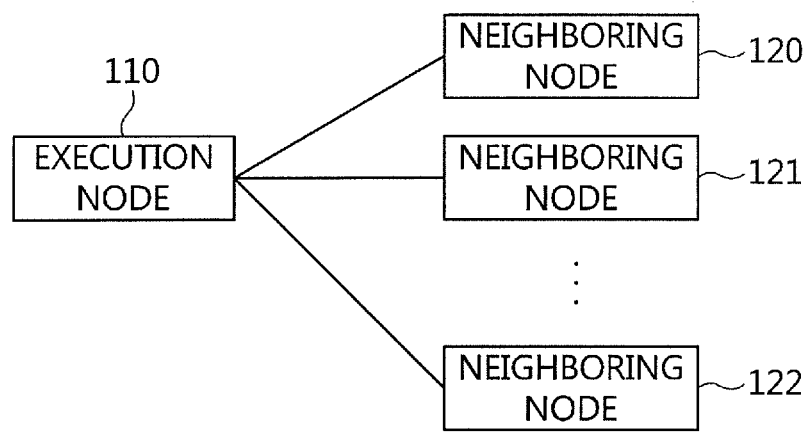
FIG. 1 is a block diagram illustrating an apparatus for authenticating a process according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is a block diagram illustrating an apparatus for authenticating a process according to an embodiment of the present invention.

Referring to FIG. 1, the apparatus for authenticating a process according to an embodiment of the present invention includes an execution node 110 and neighboring nodes 120 to 122.

The execution node 110 serves to authenticate a process to be executed by comparing local authentication data with adjacent authentication data that is received from a neighboring node and to execute the process.

Each of the neighboring nodes 120 to 122 transmits the adjacent authentication data to the execution node in response to a request from the execution node.

Here, FIG. 1 illustrates multiple neighboring nodes, but the embodiment of the present invention is not limited to this example. That is, there may be only one neighboring node.

In this case, the roles of the execution node and the neighboring node may be switched therebetween according to the usage environment.

For example, node 1 may be an execution node, and node 2 may be a neighboring node. Conversely, node 2 may be an execution node, and node 1 may be a neighboring node.

The execution node 110 and the neighboring nodes 120 to 122 will be described in detail with reference to FIGS. 2 and 3.

Figure 2:
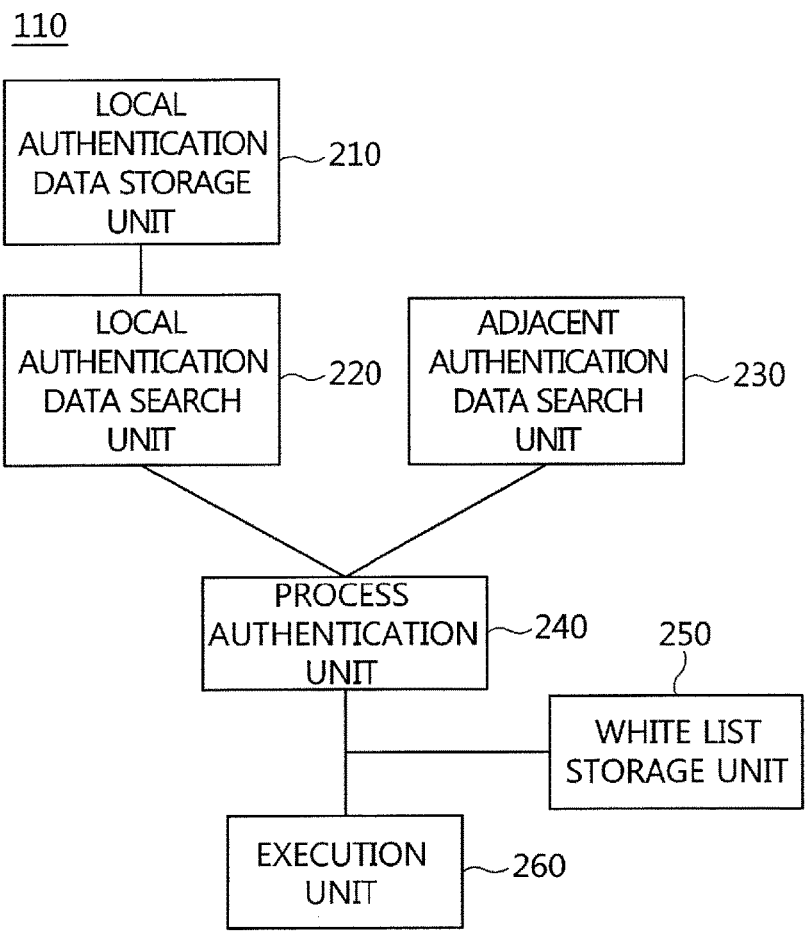
FIG. 2 is a block diagram illustrating the execution node shown in FIG. 1.

FIG. 2 is a block diagram illustrating the execution node shown in FIG. 1.

Referring to FIG. 2, the execution node, illustrated in FIG. 1, includes a local authentication data storage unit 210, a local authentication data search unit 220, an adjacent authentication data search unit 230, a process authentication unit 240, a white list storage unit 250, and an execution unit 260.

The local authentication data storage unit 210 stores multiple process identifiers.

Here, a process identifier is consistent whenever a corresponding process is executed.

Unlike a PID, which changes whenever a process is executed, a process identifier is unique information about the process, and the process to be executed may be identified using the process identifier.

Specifically, the PID of a process is obtained, and the process identifier thereof may be obtained using the PID.

In this case, the process identifier may be extracted based on one or more of the code area, the header, and an extra flag of the process.

In particular, for a high level of security, a process identifier may be extracted based on the code area of a process in order to prevent the process from being forged by intrusion, and in this case, a hash function may be used.

The local authentication data storage unit 210 extracts and stores the authentication data of a process to be approved by an administrator in advance, and the authentication data may be stored in a protected area so as to avoid modification thereof during execution.

The local authentication data search unit 220 extracts local authentication data corresponding to the process to be executed from among the multiple process identifiers.

In other words, receiving the process identifier as an input, authentication data corresponding thereto is extracted. Because the authentication data extracted by the local authentication data search unit 220 is authentication data extracted from the execution node that will execute the process, the data is local authentication data.

The adjacent authentication data search unit 230 requests the neighboring node to transmit adjacent authentication data corresponding to the process to be executed and receives the authentication data.

In this case, the adjacent authentication data search unit 230 transmits a request that includes a process identifier to the neighboring node, and the neighboring node extracts adjacent authentication data by inputting the received process identifier and transmits the authentication data to the execution node.

The process in which the neighboring node extracts and provides adjacent authentication data will be described with reference to FIG. 3.

The process authentication unit 240 compares the local authentication data with the adjacent authentication data so as to authenticate the process to be executed.

In this case, when the local authentication data is the same as the adjacent authentication data, the process is regarded as a safe process that has not been forged by intrusion. Accordingly, the process to be executed is authenticated and the execution of the process is enabled.

As described above, the apparatus for authenticating a process may include multiple neighboring nodes.

In this case, the adjacent authentication data search unit 230 transmits a request to each of the multiple neighboring nodes, and receives adjacent authentication data from each of the multiple neighboring nodes.

Accordingly, the process authentication unit 240 compares the local authentication data with all of the multiple pieces of adjacent authentication data received from the multiple neighboring nodes, whereby the process to be executed may be authenticated.

In other words, if the local authentication data is the same as all of the multiple pieces of adjacent authentication data, the process to be executed may be authenticated. Therefore, tampering may be detected through the duplicate comparison.

Alternatively, the process authentication unit 240 may authenticate the process by comparing the local authentication data with adjacent authentication data received from a neighboring node selected in advance from among the multiple neighboring nodes.

In other words, the process to be executed may be authenticated by comparing the local authentication data with adjacent authentication data selected from among the multiple pieces of adjacent authentication data.

In this case, after multiple pieces of adjacent authentication data are received from all of the neighboring nodes, the adjacent authentication data of a preset neighboring node may be used. Alternatively, a request is transmitted only to the preset neighboring node, and adjacent authentication data may be received from the corresponding neighboring node.

Here, the preset neighboring node may comprise multiple neighboring nodes. For example, adjacent authentication data are received from eight neighboring nodes, and among them, two pieces of adjacent authentication data from two preset neighboring nodes may be compared with the local authentication data in order to authenticate the process.

In this case, the selection of the preset neighboring nodes may be made depending on the process to be executed.

In other words, the preset neighboring nodes may differ according to the process to be executed.

In this case, it is clear that the relationship between the process to be executed and the preset neighboring node is not limited to a one-to-one relationship.

That is, the relationship between the process to be executed and the preset neighboring node may be a one-to-one relationship, a many-to-one relationship, a one-to-many relationship, or a many-to-many relationship.

For example, node 1 may be assigned to authenticate process A, or nodes 1 to 4 may be assigned to authenticate process A. Alternatively, node 1 may be used to authenticate both process A and process B, or nodes 1 to 8 may be used to authenticate processes A to D.

The white list storage unit 250 stores a list of processes that do not need to be authenticated.

In other words, the processes stored in the white list storage unit 250 may be executed without undergoing the above-described authentication process.

The execution unit 260 executes the process when the authentication is successful.

In this case, if the process to be executed is stored in the white list storage unit 250, the execution unit 260 regards the process as having been successfully authenticated and may execute the process.

When the authentication is not successful, the process is prevented from being executed, and a log pertaining thereto may be recorded.

Figure 3:
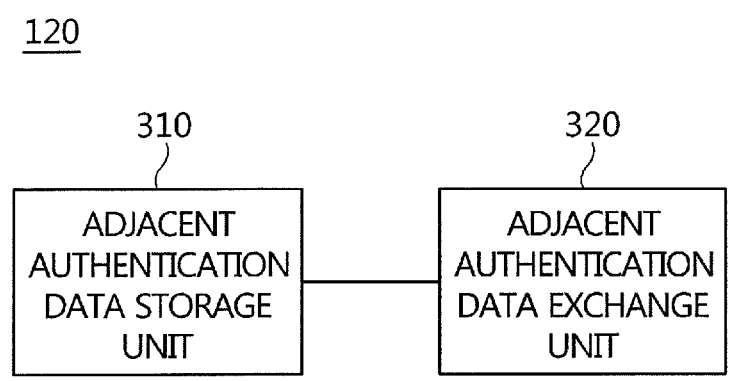
FIG. 3 is a block diagram illustrating a neighboring node shown in FIG. 1.

FIG. 3 is a block diagram illustrating the neighboring node shown in FIG. 1.

Referring to FIG. 3, the neighboring node, illustrated in FIG. 1, includes an adjacent authentication data storage unit 310 and an adjacent authentication data exchange unit 320.

The adjacent authentication data storage unit 310 stores multiple process identifiers.

Here, a process identifier is the same whenever the corresponding process is executed.

Unlike a PID, which changes whenever a process is executed, a process identifier is unique information about the process, and the process may be identified using the process identifier.

Specifically, the PID of a process is obtained, and the process identifier thereof may be obtained using the PID.

In this case, the process identifier may be extracted based on one or more of the code area, the header, and an extra flag of the process.

In particular, for a high level of security, a process identifier may be extracted based on the code area of a process in order to prevent the process from being forged by intrusion, and in this case, a hash function may be used.

Here, the adjacent authentication data storage unit 310 extracts and stores the authentication data of a process to be approved by an administrator in advance, and the authentication data may be stored in a protected area so as to avoid modification thereof during execution.

The adjacent authentication data exchange unit 320 extracts adjacent authentication data corresponding to the process to be executed from among the multiple process identifiers.

In other words, receiving the process identifier as an input, authentication data corresponding thereto is extracted. Because the authentication data extracted by the adjacent authentication data exchange unit 320 is authentication data extracted from a neighboring node rather than the execution node, which will execute the process, this data is adjacent authentication data.

In this case, the process identifier to be input is received from the execution node. That is, the execution node transmits a request that includes the process identifier to the neighboring node.

As described above, the neighboring node may comprise multiple neighboring nodes. In this case, each of the neighboring nodes receives a request from the execution node and transmits adjacent authentication data.

In this case, the execution node may use all of the adjacent authentication data in order to authenticate the process, or may use only adjacent authentication data from a preset neighboring node for the authentication.

In this case, after the execution node transmits a request to all of the neighboring nodes and receives multiple pieces of adjacent authentication data, it may use only adjacent authentication data from a preset neighboring node for the authentication. Alternatively, the execution node transmits a request only to the preset neighboring node and receives adjacent authentication data only from the preset neighboring node.

Figure 4:
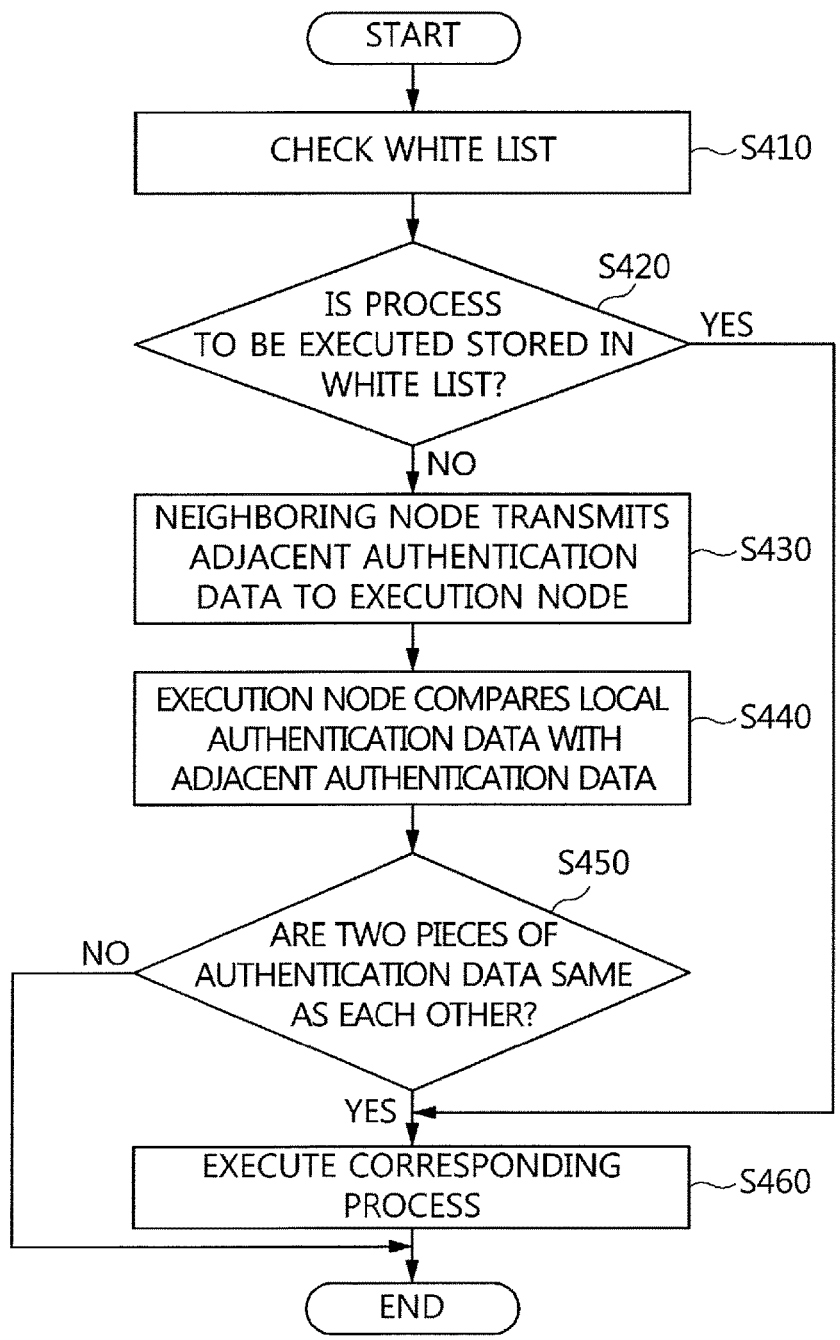
FIG. 4 is a flow chart illustrating a method for authenticating a process according to an embodiment of the present invention.

FIG. 4 is a flowchart of a method for authenticating a process according to an embodiment of the present invention.

Referring to FIG. 4, the method for authenticating a process checks whether a process to be executed is in a list of processes that do not need to be authenticated, that is, a white list, at step S410. If the process to be executed is in the list of processes at step S420, the process is regarded as having been successfully authenticated.

In other words, processes in the white list may be executed without authentication.

Then, in the method for authenticating a process according to an embodiment of the present invention, a neighboring node transmits adjacent authentication data to the execution node at step S430.

Here, the neighboring node may comprise multiple neighboring nodes, and each of the multiple neighboring nodes may transmit adjacent authentication data to the execution node.

Specifically, the execution node transmits a request that includes a process identifier to the neighboring node, and the neighboring node extracts adjacent authentication data using the process identifier as an input and transmits the extracted adjacent authentication data to the execution node.

The step for transmitting the adjacent authentication data will be described in detail with reference to FIG. 6.

Also, in the method for authenticating a process according to an embodiment of the present invention, the execution node authenticates the process to be executed at step S440 by comparing the local authentication data with the adjacent authentication data.

The step for authenticating the process to be executed will be described in detail with reference to FIG. 5.

Also, in the method for authenticating a process according to an embodiment of the present invention, when the authentication of the process is successful at step S450, the execution node executes the corresponding process at step S460.

In this case, if the process is in the white list, the execution node regards the process as having been successfully authenticated and may execute the process.

When the authentication is not successful, the process is prevented from being executed, and a log pertaining thereto may be recorded.

Figure 5:
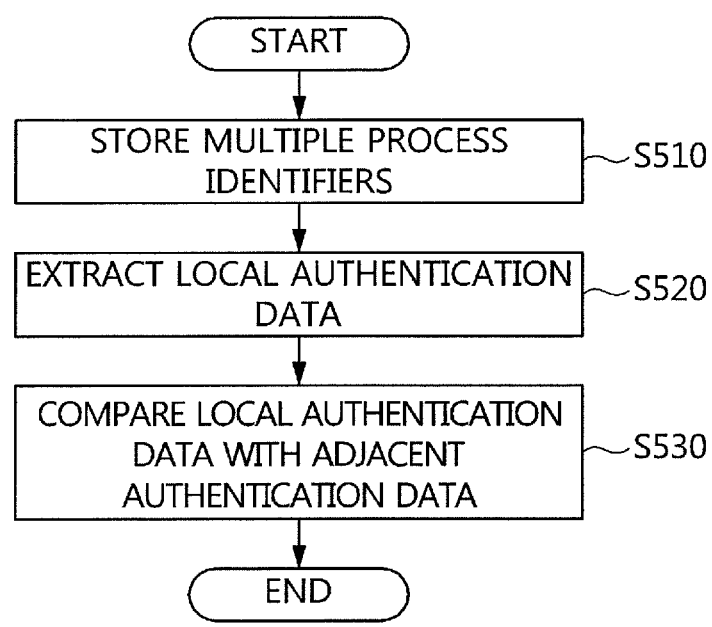
FIG. 5 is a flowchart of the step, illustrated in FIG. 4, in which a process to be executed is authenticated by comparing local authentication data with adjacent authentication data.

FIG. 5 is a flowchart of the step, illustrated in FIG. 4, in which a process is authenticated by comparing the local authentication data with adjacent authentication data.

Referring to FIG. 5, in the step illustrated in FIG. 4, in which a process is authenticated by comparing the local authentication data with adjacent authentication data, multiple process identifiers are stored at step S510.

Here, a process identifier is consistent whenever a corresponding process is executed.

Unlike a PID, which changes whenever a process is executed, a process identifier is unique information about the process, and the process may be identified using the process identifier.

Specifically, the PID of a process is obtained, and the process identifier thereof may be obtained using the PID.

In this case, the process identifier may be extracted based on one or more of the code area, the header, and an extra flag of the process.

In particular, for a high level of security, a process identifier may be extracted based on the code area of a process in order to prevent the process from being forged by intrusion, and in this case, a hash function may be used.

Here, multiple process identifiers are stored after being extracted from the authentication data of the process to be approved by an administrator in advance, and may be stored in a protected area so as to avoid modification thereof during execution.

Also, in the step illustrated in FIG. 4, in which a process is authenticated by comparing the local authentication data with adjacent authentication data, local authentication data corresponding to the process to be executed is extracted from among the multiple process identifiers at step S520.

In other words, receiving the process identifier as an input, authentication data corresponding thereto is extracted. Because the authentication data is extracted from the execution node that will execute the process, this data is local authentication data.

Also, in the step illustrated in FIG. 4, in which a process is authenticated by comparing the local authentication data with adjacent authentication data, the local authentication data is compared with the adjacent authentication data at step S530.

In this case, when the local authentication data is the same as the adjacent authentication data, the process is regarded as a safe process that has not been forged by intrusion. Accordingly, the process to be executed is authenticated and the execution of the process is enabled.

As described above, there may be multiple neighboring nodes.

In this case, the execution node transmits a request to each of the multiple neighboring nodes, and receives adjacent authentication data from each of the multiple neighboring nodes.

Accordingly, the execution node compares the local authentication data with all of the multiple pieces of adjacent authentication data received from the multiple neighboring nodes, whereby the process to be executed may be authenticated.

In other words, the process may be authenticated only when the local authentication data is the same as all of the adjacent authentication data. Therefore, tampering may be detected by the duplicate comparison.

Alternatively, the execution node may authenticate the process by comparing the local authentication data with adjacent authentication data received from a neighboring node that is selected in advance from among the multiple neighboring nodes.

In other words, the process to be executed may be authenticated by comparing the local authentication data with adjacent authentication data selected from among multiple pieces of adjacent authentication data.

In this case, after multiple pieces of adjacent authentication data are received from all of the neighboring nodes, adjacent authentication data of a preset neighboring node may be used. Alternatively, a request is transmitted only to the preset neighboring node, and adjacent authentication data may be received only from the corresponding neighboring node.

Here, the preset neighboring node may comprise multiple neighboring nodes. For example, adjacent authentication data may be received from eight neighboring nodes, and among them, two pieces of adjacent authentication data from two preset neighboring nodes may be compared with the local authentication data in order to authenticate the process.

In this case, the selection of the preset neighboring nodes may be made depending on the process to be executed.

In other words, the preset neighboring nodes may differ according to the process to be executed.

In this case, it is clear that the relationship between the process to be executed and the preset neighboring node is not limited to a one-to-one relationship.

That is, the relationship between the process to be executed and the preset neighboring node may be a one-to-one relationship, a many-to-one relationship, a one-to-many relationship, or a many-to-many relationship.

For example, node 1 may be assigned to authenticate process A, or nodes 1 to 4 may be assigned to authenticate process A. Alternatively, node 1 may be used to authenticate both process A and process B, or nodes 1 to 8 may be used to authenticate processes A to D.

Figure 6:
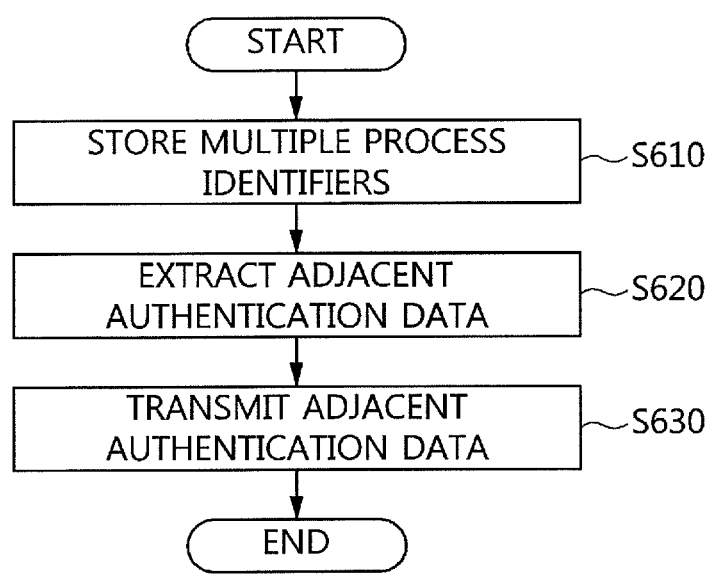
FIG. 6 is a flowchart of the step, illustrated in FIG. 4, in which adjacent authentication data is transmitted.

FIG. 6 is a flowchart of the step, illustrated in FIG. 4, in which adjacent authentication data is transmitted.

Referring to FIG. 6, in the step illustrated in FIG. 4, in which the adjacent authentication data is transmitted, multiple process identifiers are stored at step S610.

Here, a process identifier is consistent whenever a corresponding process is executed.

Unlike a PID, which changes whenever a process is executed, a process identifier is unique information about the process, and the process may be identified using the process identifier.

Specifically, the PID of a process is obtained, and the process identifier thereof may be obtained using the PID.

In this case, the process identifier may be extracted based on one or more of the code area, the header, and an extra flag of the process.

In particular, for a high level of security, a process identifier may be extracted based on the code area of a process in order to prevent the process from being forged by intrusion, and in this case, a hash function may be used.

Here, the multiple process identifiers are stored after being extracted from the authentication data of the process to be approved by an administrator in advance, and may be stored in a protected area to avoid modification thereof during execution.

Also, in the step illustrated in FIG. 4, in which adjacent authentication data is transmitted, adjacent authentication data corresponding to the process to be executed is extracted from among the multiple process identifiers at step S620.

In other words, receiving the process identifier as an input, authentication data corresponding thereto is extracted. Because the authentication data is extracted from the neighboring node rather than the execution node that will execute the process, this data is adjacent authentication data.

In this case, the process identifier to be input is received from the execution node. That is, the execution node transmits a request that includes the process identifier to the neighboring node.

Also, in the step illustrated in FIG. 4, in which adjacent authentication data is transmitted, the adjacent authentication data is transmitted to the execution node at step S630.

As described above, the neighboring node may comprise multiple neighboring nodes. In this case, each of the neighboring nodes receives a request from the execution node and transmits adjacent authentication data.

In this case, the execution node may use all of the adjacent authentication data in order to authenticate the process, or may use only adjacent authentication data from a preset neighboring node for the authentication.

In this case, after the execution node transmits a request to all of the neighboring nodes and receives adjacent authentication data, it may use adjacent authentication data from a preset neighboring node for the authentication. Alternatively, the execution node may transmit a request only to the preset neighboring node and receive adjacent authentication data only from the preset neighboring node.

Process authentication data of the present invention is created before service starts, and the authentication data cannot be modified during service. In other words, modification of the authentication data during the service is regarded as being the result of intrusion, and the modified authentication data is blocked through comparison with authentication data of a neighboring node.

The authentication data stored in the execution node and the authentication data stored in the neighboring node are maintained the same as each other. Also, the authentication data cannot be modified during the execution, and may be modified only by an administrator. The process authentication data may be extracted from the code area of a process that will be approved by the administrator, and may be distributed to each node before service thereof commences.

In this case, in order to obtain the process identifier, the same algorithm must be used both when the process authentication data is created prior to service and when the process is authenticated.

According to the present invention, a process may be authenticated before the execution thereof for the security of a system.

Also, the present invention stores unique information about a process, the execution of which will be approved, in a neighboring node and uses the information for authenticating the process in a redundant system, which is adopted for high availability.

Also, the present invention may enhance the security and safety of a system through the process authentication.

Also, the present invention may reduce the cost of a redundant system by avoiding the use of an additional authentication data storage medium.

Also, the present invention may guarantee complete security at the process level unless all nodes in a redundant system are hacked. Because a neighboring node functions as a slave node or a backup node in a common redundant system, the authentication data of the neighboring node may be prevented from tampering, whereby the security may be greatly improved.

Also, the present invention enables an administrator to prevent a node from being occupied by intruders if the node is a service node in the form of an embedded device or an appliance in which a process to be executed may be detected in advance.

As described above, the apparatus and method for authenticating a process according to the present invention are not limitedly applied to the configurations and operations of the above-described embodiments, but all or some of the embodiments may be selectively combined and configured, so that the embodiments may be modified in various ways.

What is claimed is:

1. An apparatus for authenticating a process to be executed, comprising:
   a hardware processor; and
   a memory, wherein the memory stored therein computer-executable instructions which when executed by the processor causes the processor to:
   select preset neighboring nodes from a plurality of neighboring nodes for the process to be executed, wherein the preset neighboring nodes selected are a subset of the plurality of neighboring nodes;
   transmit, by each of the plurality of neighboring nodes, adjacent authentication data to an execution node of a redundant system in a network in response to a request from the execution node; wherein each of the plurality of neighboring nodes stores one piece of multiple pieces of the adjacent authentication data;
   authenticate, by the execution node, the process to be executed by comparing local authentication data with one or more pieces of the multiple pieces of the adjacent authentication data received from only the selected preset neighboring nodes;
   wherein the execution node comprises:
      a local authentication data storage circuit for storing multiple process identifiers, wherein each of the multiple process identifiers is extracted based on one or more of a code area, a header and an extra flag of the process to be executed;
      a local authentication data search circuit for extracting the local authentication data corresponding to the process to be executed from among the multiple process identifiers;
      an adjacent authentication data search circuit for requesting and receiving the adjacent authentication data corresponding to the process to be executed from the plurality of neighboring nodes;
      a process authentication circuit for authenticating the process to be executed by determining whether the local authentication data is equal to a subset of the multiple pieces of the adjacent authentication data; and
      an execution circuit for executing the process to be executed when the process to be executed is successfully authenticated; and
   wherein the execution node can be a neighboring node, and a neighboring node can be an execution node.

2. The apparatus of claim 1, wherein the execution node further comprises a white list storage circuit for storing a list of processes that do not need to be authenticated, and
   when the process to be executed is stored in the white list storage circuit, the execution circuit regards the process as being successfully authenticated and executes the process to be executed.

3. The apparatus of claim 1, wherein each of the multiple process identifiers is maintained consistent throughout multiple executions of a process corresponding to a process identifier to be executed.

4. The apparatus of claim 1, wherein the preset neighboring nodes are determined depending on the process to be executed.

5. A method for authenticating a process to be executed, comprising:
   selecting preset neighboring nodes from a plurality of neighboring nodes for the process to be executed, wherein the preset neighboring nodes selected are a subset of the plurality of neighboring nodes;
   transmitting, by each of the plurality of neighboring nodes, adjacent authentication data to an execution node of a redundant system in a network in response to a request from the execution node; wherein each of the plurality of neighboring nodes stores one piece of multiple pieces of the adjacent authentication data;
   authenticating, by the execution node, the process to be executed by comparing local authentication data with one or more pieces of the multiple pieces of the adjacent authentication data received from only the selected preset neighboring nodes;
   executing, the by execution node, the process to be executed when authentication of the process to be executed is successful,
   wherein the execution node comprises:
      a local authentication data storage circuit for storing multiple process identifiers, wherein each of the multiple process identifiers is extracted based on one or more of a code area, a header and an extra flag of the process to be executed;
      a local authentication data search circuit for extracting the local authentication data corresponding to the process to be executed from among the multiple process identifiers;
      an adjacent authentication data search circuit for requesting and receiving the adjacent authentication data corresponding to the process to be executed from the plurality of neighboring nodes;
      a process authentication circuit for authenticating the process to be executed by determining whether the local authentication data is equal to a subset of the multiple pieces of the adjacent authentication data; and
      an execution circuit for executing the process to be executed when the process to be executed is successfully authenticated; and
   wherein the execution node can be a neighboring node, and a neighboring node can be an execution node.

6. The method of claim 5, further comprising:
   storing a list of processes that do not need to be authenticated; and
   regarding the process to be executed as being successfully authenticated if the process to be executed is included in the list of processes.

7. The method of claim 5, wherein each of the process identifiers is maintained consistent throughout multiple executions of a process corresponding to a process identifier to be executed.

8. The method of claim 5, wherein the preset neighboring nodes are determined depending on the process to be executed.

* * * * *